United States Patent Office 3,796,568
Patented Mar. 12, 1974

3,796,568
FLAME SMELTING AND REFINING OF COPPER
Andrew Geza Szekely, Yorktown Heights, and Peter Wrampe, Pomona, N.Y., assignors to Union Carbide Corporation, New York, N.Y.
Filed Dec. 27, 1971, Ser. No. 211,896
Int. Cl. C22b 15/00
U.S. Cl. 75—74                                7 Claims

ABSTRACT OF THE DISCLOSURE

A free-flowing slurry of copper precipitate in a liquid hydrocarbon fuel is fed together with an oxygen containing gas into the internal combustion zone of a slurry burner under preselected conditions of flame temperature and oxygen to fuel ratio such that the impurities in the copper precipitate are oxidized and/or vaporized in the flame, while the copper is melted. The molten copper is collected in a fluid slag covered pool and the remaining impurities which are oxides insoluble in the copper are separated by being retained in the slag layer.

BACKGROUND

This invention relates to a process for flame smelting and refining of copper, and more particularly, to a process for producing refined copper from copper precipitate obtained from the leaching of copper ore.

Most of the copper mined in the United States comes from sulfide ore containing less than 2% copper. Generally, such ore is first concentrated by flotation to produce copper concentrate containing about 15–30% copper. The concentrate is then smelted in a reverberatory furnace to copper matte, and the matte blown to blister copper in a converter. After undergoing further refining in an anode furnace, the copper is cast into anodes for electrolytic refining. The cathodes from the electrolytic refining step are then melted and cast into wire bars or other shapes. Precious metals present in the ore, such as gold and silver, are recovered as economically important by-products of the electrolytic refining operation.

Copper is also recovered from its ores by leaching. In this process the metal is first extracted from the ore as a water soluble salt in dilute solution, and then recovered from the solution by cementation. In the cementation reaction, the copper is precipitated from the leach solution by displacement with iron; steel scrap being the conventional source of the iron. The precipitate is then separated from the spent leach solution by settling. The product, commonly referred to as "wet precipitate," is of mud-like consistency, and ordinarily contains copper in excess of 70% by weight on a dry basis. Due to its high copper content, the precipitate is an important source of copper. Nevertheless, it has to be smelted and refined to convert its copper content into a useful copper product. In present commercial practice, precipitate is smelted and refined along with flotation concentrates. The wet precipitate is first dried to a water content of 15–20% and then charged, along with the concentrate, into a reverberatory furnace. From this point on, the precipitate accompanies the concentrate through the conventional smelting and refining cycle until the copper contained in the precipitate is recovered as electrolytic copper.

The recovery of copper from copper precipitate by means of conventional smelting and refining has several disadvantages. A prime disadvantage is that copper precipitatem unlike the copper concentrate, does not contain any precious metals, and hence its electrolytic refining does not produce precious metals as a by-product. This makes it an uneconomical burden on the electrolytic refining process.

Another important disadvantage is that the smelting of a precipitate-concentrate mixture in the reverberatory furnace requires more auxiliary fuel than the smelting of concentrate alone. The high sulfur and iron content of the concentrate has a significant fuel value, and in addition, the concentrate can readily be dried to a water content of less than 10%. By contrast, copper precipitate has a very low fuel value, and usually contains water in excess of 15% even after drying. The relatively high fuel requirement for smelting precipitate also has an adverse effect on the composition of the reverberatory furnace flue gas. Precipitate smelting increases the flue gas volume and at the same time supplies much less sulfur dioxide to the gas than flotation concentrates. The resulting decrease in the sulfur dioxide concentration of the gas is undesirable, since it increases the cost of cleaning the stack gas. Ordinarily, if the $SO_2$ concentration in a gas is over 3.5% by volume, the gas can be used for sulfuric acid production. However, at concentrations lower than 3.5% by volume it cannot be used to make sulfuric acid and more costly gas cleaning methods must be used. The smelting of precipitate along with concentrate in the reverberatory furnace makes it very difficult to obtain a flue gas containing over 3.5% $SO_2$.

The difficulties and costs associated with drying wet copper precipitate prior to further processing are also substantial. Water trapped by the precipitate particles cannot be removed by simple physical means. Even with the use of filter presses and by blowing air through the filter cake, the water content of the precipitate cannot be reduced below about 15% water without oxidizing a significant amount of the copper in the precipitate. Thus, it should be apparent that a smelting and refining process which can utilize wet copper precipitate as a raw material would have numerous advantages over the present state of the art.

OBJECTS

Accordingly, it is an object of this invention to provide a new and efficient process for converting wet copper precipitate into refined copper.

It is a further object of this invention to provide a direct flame smelting and refining process whereby copper precipitate is smelted and refined, without intervening solidification and remelting of the metal, by the selective oxidation and/or volatilization of the impurities contained therein.

It is a further object of this invention to provide a process wherein smelting and refining of copper precipitate takes place in intimate contact with a flame, and without coming into intimate contact with the refractory lining of a smelting vessel.

It is a further object of this invention to provide a continuous process for the smelting and refining of copper precipitate wherein the precipitate is continuously fed into a flame, and refined metal is continuously discharged therefrom.

SUMMARY

The objects set forth above, and others which will be apparent to those skilled in the art achieved by the present invention which consists of a process for smelting and refining copper precipitate to refined copper comprising the steps of:

(1) Forming a free flowing slurry by mixing the copper precipitate with a liquid hydrocarbon fuel, (2) Feeding said slurry and an oxygen containing gas into an internal combustion zone of a slurry burner, (3) Combusting said fuel with the oxygen in the internal combustion zone of said burner to produce a stable flame, (4) Controlling the slurry and oxygen containing gas feed rates such that a predetermined ratio of oxygen to fuel is maintained which causes oxidation of selected impurities in the copper precipitate to be favored relative to the oxidation of the copper, and which causes the temperature of said flame to be maintained above the melting point of copper but below the temperature at which copper vaporization becomes excessive, whereby the copper content of the precipitate is transformed into molten copper and the impurities are (a) vaporized, in the oxide or metallic form depending upon the susceptibility of the impurity to oxidation in the flame and the vapor pressure of the impurity species formed in the flame or (b) oxidized to impurity oxide species insoluble in molten copper, and (5) Separating the molten copper from the vaporized impurity species and the insoluble impurity-oxide species by collecting the molten copper in a pool, by collecting the insoluble oxide-impurity species on top of said pool in a fluid slag layer, and by venting the vaporized impurity species.

The above process is conveniently accomplished by directing the burner and flame in a vertically downward direction, whereby collection of the molten copper is achieved by gravity and the fluid slag layer acts to filter and trap the insoluble impurity-oxide species. Separation of the insoluble oxides from the copper is also caused by their relative differences in density. The flux or slag layer which floats on top of the copper may be formed by using a flux, such as silica sand, which promotes the formation of a liquid slag by reaction with inpurity oxides, such as iron oxide, nickel oxide, alumina and the like. The flux may be mixed into the copper-fuel slurry, or may be charged directly into the copper collecting vessel.

The term "copper precipitate" as used herein is intended to mean the raw product of a precipitation plant or a launder plant which was produced from a pregnant leaching solution of copper ores by cementation with iron. This material usually contains copper in excess of 70 weight percent (calculated on a dry basis) as total contained copper in oxide and metallic form. The major impurities in this raw material are sulfur, oxygen, iron, alumina, silica and trash (e.g. wood chips) left over from the precipitant. Other impurities, such as tin, lead, arsenic and antimony, are present in smaller quantities; nevertheless, the concentration of these impurities must also be significantly reduced to obtain a refined copper product. The water content of the wet precipitate is generally in the range of 15–50 weight percent, depending on the time allowed for settling. One of the inherent advantages of the present process is that it can accept wet precipitate directly from the precipitation plant.

The term "liquid hydrocarbon fuel" as used herein is intended to mean any conventional liquid fuel, such as tar oil, kerosene, diesel oil or fuel oil. For purposes of economy, a heavy fuel oil such as Bunker C fuel oil may be used.

The term "free-flowing slurry" as used herein is intended to mean that it may easily be pumped into the burner. If the slurry is maintained under sufficiently agitated conditions, no emulsifying agent is required. However, it is generally easier to keep the solid matter in the slurry suspended in the hydrocarbon fluid by the use of a small amount of a conventional emulsifying agent, i.e., any surface active agent generally used for producing water-oil emulsions. Suitable surface active agents are alkali metal soaps or alkane sulfonates of the general formula of R—$SO_3$—Na, where R is a hydrocarbon radical having more than 17 carbon atoms.

The term "internal combustion zone" is used to mean the combustion zone in burners in which the mixing and combustion of the fuel with an oxygen containing gas take place inside the burner body, either in a combustion chamber or in a combustion throat. The combustion zone of a throat combustion burner differs from a conventional internal combustion burner in that there is no restriction in the combustion space toward the discharge end of the burner, whereas the conventional internal combustion chamber has such a restriction. Internal combustion type burners must, however, be distinguished from post-mixed burners in which the fuel and oxidant are burned under atmospheric conditions outside the burner, as, for example, in a Bunsen flame. For purposes of the present invention, post-mixed burners or flames cannot be used since they do not work.

DRAWINGS

DETAILED DESCRIPTION

In carrying out the process of the present invention, the wet copper precipitate is mixed with a fuel, the resulting slurry is combusted with oxygen producing a flame, wherein the particles in the precipitate are dispersed and brought into intimate contact with the flame. The flame conditions are chosen such that the impurities in the precipitate are removed by selective oxidation, by selective vaporization, or both, while the copper is separated and recovered in the form of a refined molten metal. Those impurities which volatize readily in the elemental form are transferred as such into the gaseous state, and purification of the copper is achieved simply by separating the gas containing the impurity vapors from the liquid copper. Separation of the copper from those impurities which oxidize and form a volatile oxide is achieved in the same manner. The remaining impurities originally present in the copper precipitate are transformed in the flame into oxides which are insoluble in molten copper and are separated from the refined copper by means of a slag layer.

The desired selectivity of oxidation and vaporization is obtained principally by controlling two process variables, (1) oxygen to fuel ratio and (2) flame temperature. The oxygen to fuel ratio governs the oxidizing potential of the flame which determines which of the elements present in the precipitate-fuel slurry will be oxidized and which oxides will be reduced to the metallic state. The flame temperature governs the vapor pressures of the various substances present in the flame, and therefore, it determines the selectivity of their vaporization. The extent of this vaporization is also controlled by the volume of combustion gas which in turn is governed primarily by the water content of the precipitate and the nitrogen content of the oxidizing gas used for combusting the fuel.

In using the process to smelt and refine copper precipitate, it has been found possible to operate with flame temperatures and oxygen to fuel ratios which simultaneously satisfy the above described requirements of refining, i.e., which cause the copper content of the precipitate to be converted into molten refined copper metal, cause the majority of impurities, to be vaporized in the elemental or oxide form, and cause some impurities, e.g., iron and nickel, to be oxidized to an oxide phase insoluble in the metal.

Figure 1:
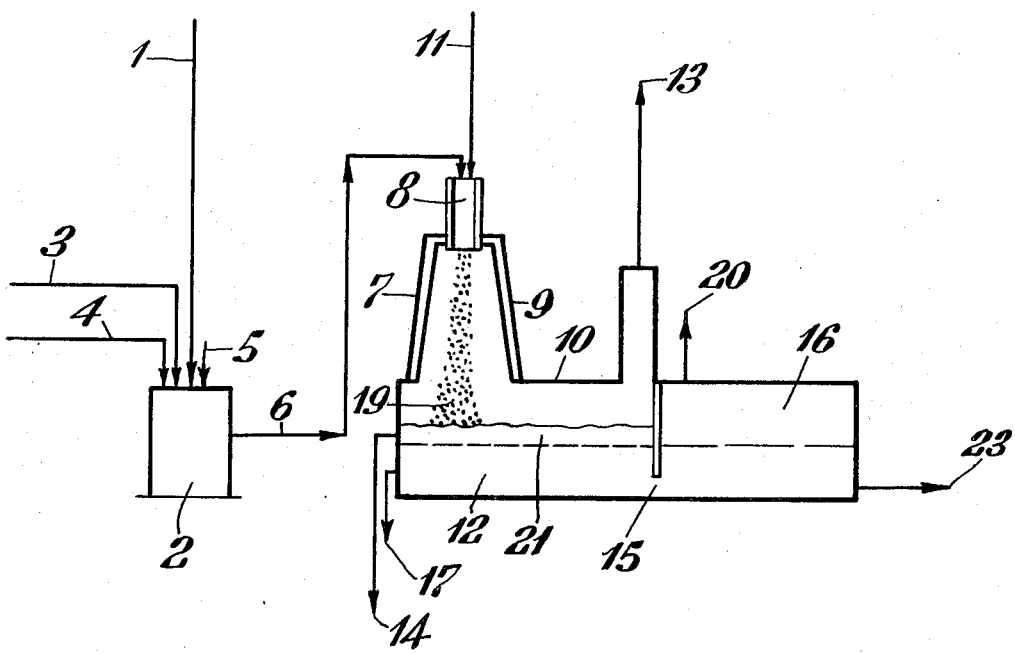
FIG. 1 is a flow sheet of a smelting and refining process in accordance with the present invention.

FIG. 1 shows a simplified flow sheet of a flame smelting process in accordance with the present invention. The wet precipitate 1, normally containing about 15–50% water by weight, is charged into a mixing tank 2, where it is mixed with a hydrocarbon fuel 3 and if desired, an emulsifying agent 4, and flux 5. The resulting mixture, which is a free-flowing slurry 6, is pumped into burner 8 positioned facing downward in refractory-lined shaft 9 of the flame smelting furnace 10. The slurry is atomized and mixed in the combustion-chamber of burner 8 with an oxygen containing gas 11. The flame produced by the combustion of the fuel with the oxygen, entrains and melts the solid particles of the copper precipitate. The smelting and refining of the precipitate takes place in the hot flame—the base of which is inside of the combustion zone of the burner 8, away from the refractory lining 7 of shaft 9.

The molten droplets of copper 19 reaching the hearth portion of furnace 10 by passing through the fluid slag layer 21 and are collected in a molten pool of copper 12. Non-volatile metal oxides, such as iron oxides, are slagged by the flux and are retained in the slag layer 21. The gaseous combustion products and volatilized impurities 13 leave the smelting furnace 10 through a suitable gas discharge port. Slag layer 21 may be tapped continuously or on a semi-continuous basis through taphole 14. The slag may then be transferred to a reverberatory furnace or to a slag flotation unit to recover its copper content by conventional means.

The refined copper metal in pool 12 communicates through subsurface passage 15 with a deoxidizing section 16 of furnace 10 where the dissolved oxygen content of the metal is reduced by conventional means, such as gas-poling with natural gas to the level desired in the cast product. Following deoxidation, the refined metal 23 may be withdrawn and cast directly into bars or into other desired shapes. Off gases 20 are vented.

It should be noted that the refined copper 12 need not necessarily be deoxidized in section 16 of furnace 10, but may be withdrawn from furnace 10, as for example through taphole 17, and deoxidized in a separate vessel.

Figure 2:
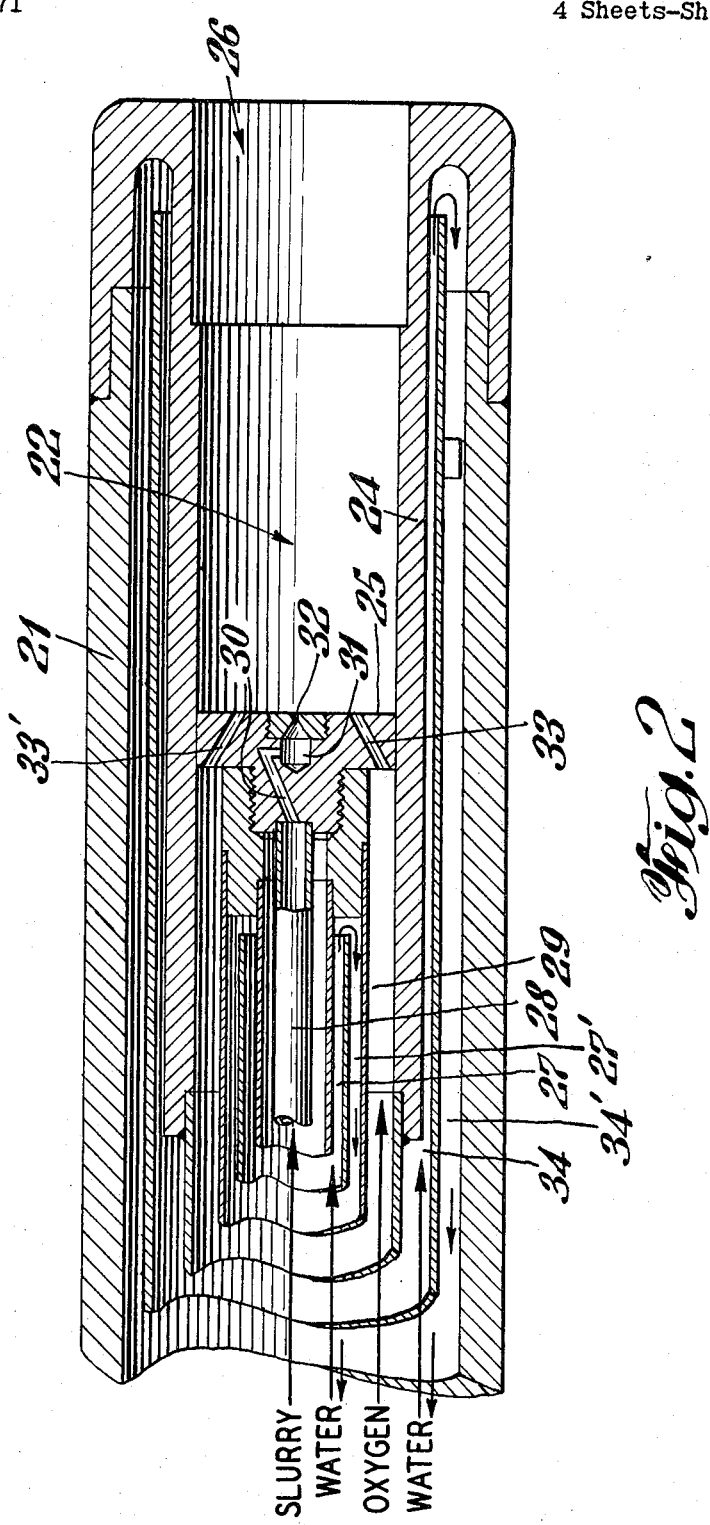
FIG. 2 is a longitudinal cross-sectional view of a burner head suitable for practicing present invention.

Referring to FIG. 2, there is shown an internal combustion burner of the throat combustion type suitable for practicing the present invention. The three main components of the burner are a water-cooled barrel 21, the combustion throat 22 and a conduit system for the oxidizing gas and slurry. Barrel 21 is water cooled. Combustion throat 22 is cylindrical in shape, enclosed by the inner surface of tube 24 and base element 25, but unrestricted toward the discharge end 26 of the throat 22. The conduit system consists of a plurality of concentric tubes; conduits 27 and 27' providing for the inner passage of cooling water, conduits 34 and 34' for the outer passage of cooling water, a slurry conduit 28 for supplying the slurry, and oxygen conduit 29 for supplying the oxidizing gas to the combustion throat 22. Slurry conduit 28 communicates through passage 30 with swirl chamber 31. The slurry obtains a spin in the swirl chamber 31 and enters throat 22 through orifice 32 in the form of a fine spray. The hydrocarbon fuel in the atomized slurry is combusted in front of base element 25 by the oxidizing gas which is conducted to throat 22 through oxygen conduit 29 and a plurality of orifices 33 and 33'. The flame resulting from the combustion of the fuel is sustained in throat 22 by a continuous supply of the slurry and of the oxidizing gas, so that smelting and refining of the copper precipitate in the slurry starts right in front of base element 25 inside throat 22.

While the burner shown in FIG. 2 illustrates one type of an internal combustion burner suitable for use in the present invention, it is to be understood that other types of slurry burners constructed with different slurry dispersion system are equally acceptable. However, regardless of the means employed for dispersing the slurry and mixing it with the oxidizing gas, it is essential that the mixing and ignition of the fuel with oxygen take place within the burner. Only in this way can a stable flame be sustained within the burner body before the reactants reach the discharge end of the combustion zone.

Figure 3:
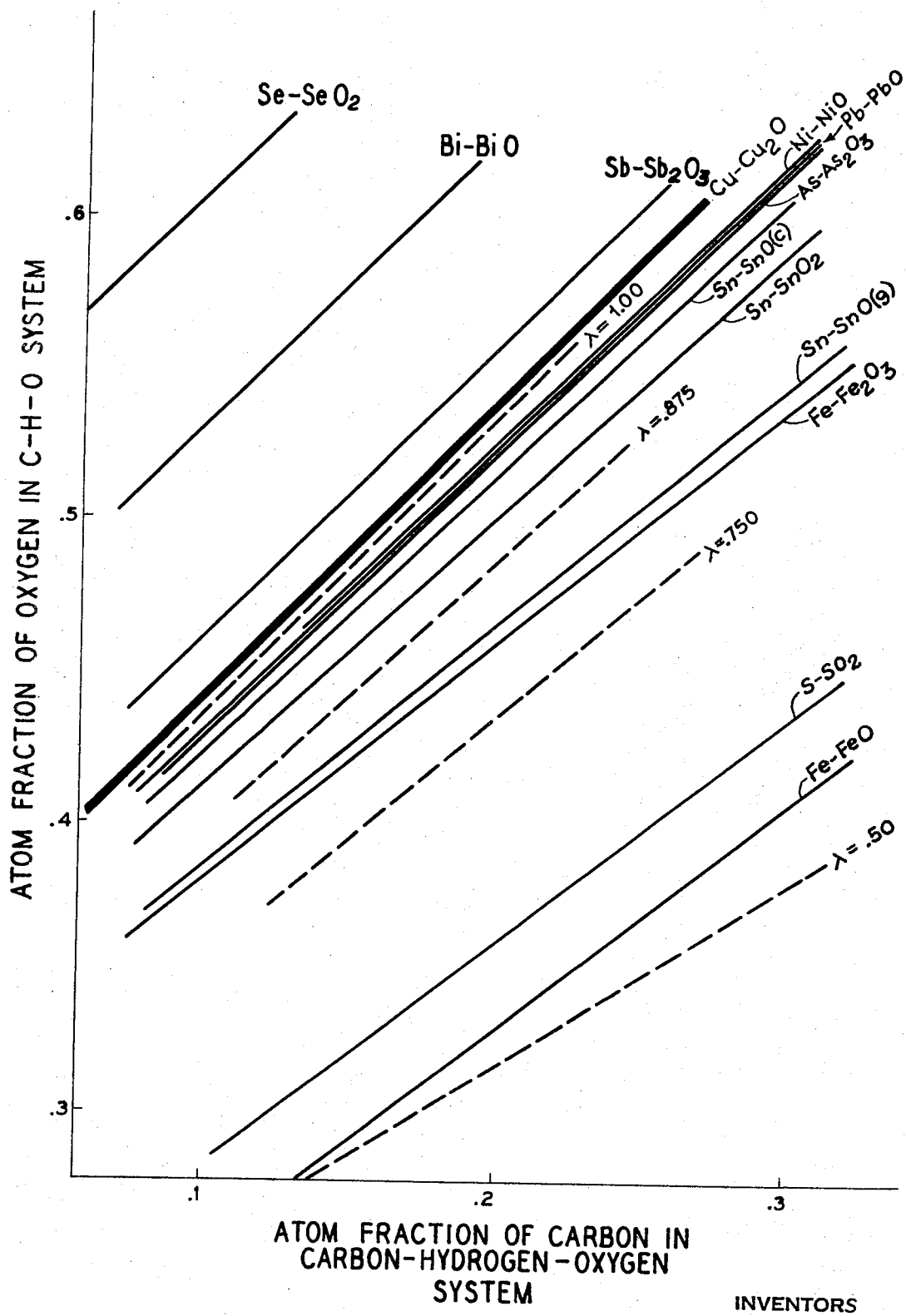
FIG. 3 is an oxide-metal equilibrium diagram for copper and elements commonly present as impurities in copper precipitates and copper ores.
Figure 4:
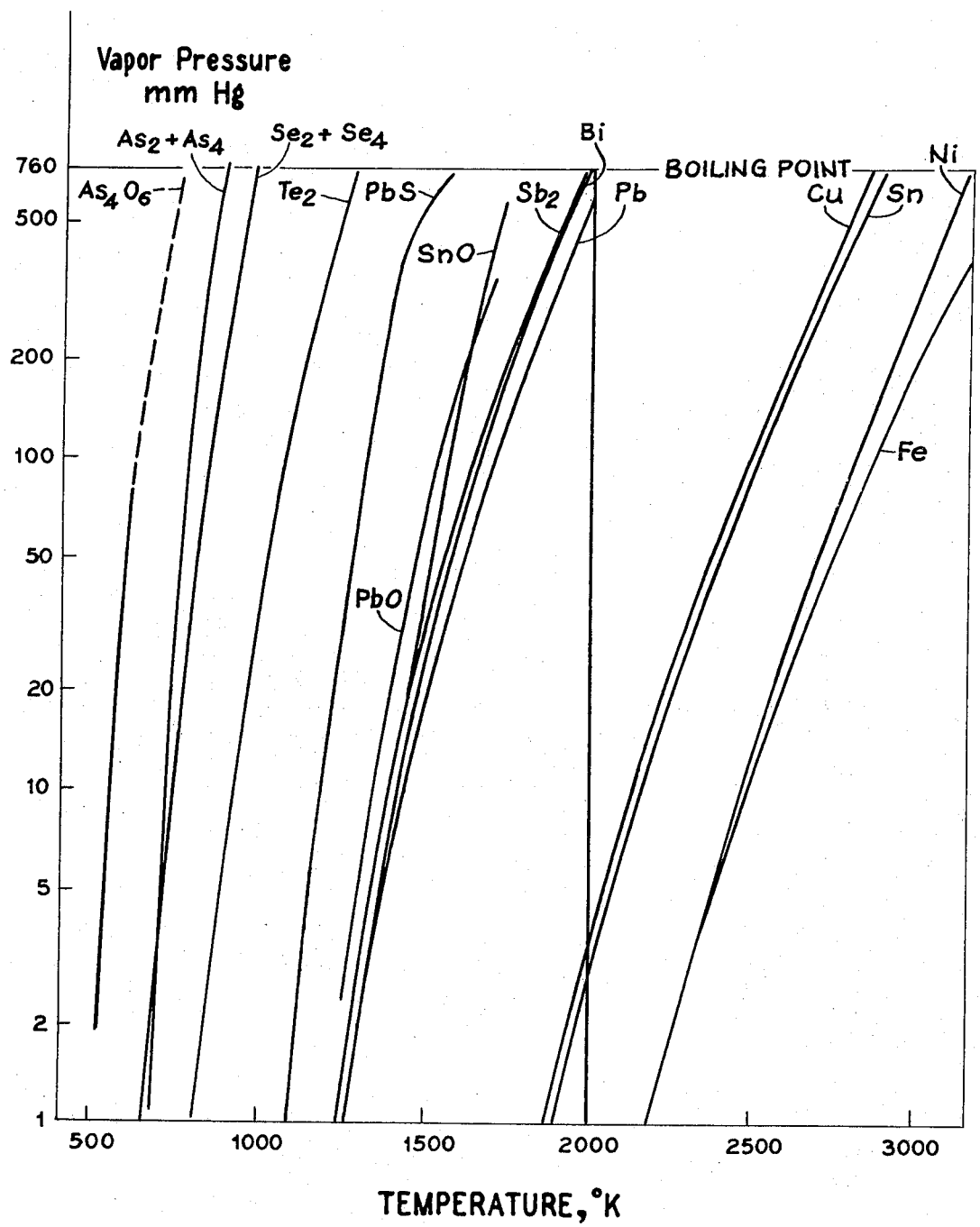
FIG. 4 is a plot of vapor pressure as a function of temperature for compounds and metals frequently present in copper precipitates and copper ores.

FIGS. 3 and 4 serve to illustrate and explain the principal scientific relationships which govern oxidation and vaporization of impurities in the flame. FIG. 3 is a diagram which superimposes upon a hydrocarbon combustion diagram, an oxide-metal equilibrium diagram for various elements frequently present in a copper precipitate. The dashed lines connect combustion gas compositions which have equal oxidizing potential, characterized by the combustion factor, $\lambda$ (lambda). The dashed line labeled $\lambda = 1.00$ connects points representing combustion gas compositions using, for each such fuel, the stoichiometric amount of oxygen. Similarly, the line labeled $\lambda = 0.50$ refers to combustion gas compositions obtained by using 50% of the stoichiometric oxygen requirement for any hydrocarbon fuel. The solid straight lines connect points where the metal and the oxide are in equilibrium with various combustion gas mixtures of the fuel. Each such combustion gas mixture corresponds to a point in the carbon-oxygen-hydrogen system and is located on this diagram by means of its carbon atom fraction and its oxygen atom fraction. The sum of the atom fractions of carbon, oxygen and hydrogen being equal to one. Above the solid equilibrium line, the oxide form of the metal is stable, while below the equilibrium line, the metallic form is stable.

From FIG. 3 it can be seen that if any hydrocarbon fuel is combusted with oxygen at close to stoichiometric conditions (dashed line $\lambda = 1.00$), copper is thermodynamically favored to be in the metallic state, while the flame will oxidize all the elements below this line, i.e. Ni, Pb, As, Sn, S and Fe.

FIG. 4 shows the vapor pressure of selected elements frequently present in copper precipitate and of their oxides as a function of temperature. It serves to illustrate the effect of flame temperature on the selective vaporization of the impurities in copper precipitate. As seen from FIG. 4, at a temperature of 2000° K, the vapor pressure of copper is less than 5 mm. mercury, while the vapor pressures of the most serious contaminants of copper or of their respective oxides approaches or exceeds 760 mm. mercury. Most importantly, it can be observed in FIG. 4 that the oxidation of some of the elements, such as Sn and Pb, thermodynamically enhances their removal by vaporization because the oxides of these elements have a higher vapor pressure than the metal. It should thus be evident that maintaining a proper oxidation potential in the flame and simultaneously adjusting the flame temperature to a proper level is essential for the efficient removal of impurities by their selective oxidation and/or vaporization in the process of the invention.

The oxidation potential of the flame is controlled by the oxygen/fuel ratio and is numerically expressed by the value of the combustion factor, $\lambda$. The flame temperature is controlled by the composition of the slurry, primarily by the ratio of fuel to the wet precipitate, by the combustion factor and by the oxygen concentration in the oxidizing gas. The oxygen concentration in the oxidizing gas is selected primarily to satisfy the temperature requirement in the flame and also to regulate the combustion gas volume. This gas volume is principally affected by the composition of the wet charge, primarily its water content, and the nitrogen concentration of the oxidizing gas. It is advantageous in practice to operate with moderate gas volumes by using pure oxygen for the combustion of the slurry if the water content of the raw material is high, and by using air or oxygen enriched air when the water content is low. It is generally preferred to use pure oxygen or oxygen enriched air containing at least 24 volume percent oxygen to keep copper vaporization at a minimum and to reduce the size of the gas handling equipment, such as heat exchangers and gas cleaning units.

It has been found that the temperature of the flame and the oxygen/fuel ratio have to be controlled between close limits in practicing the present invention in order to assure satisfactory smelting and refining of the raw material. The flame temperature should be in the range of 1900° K. to 2350° K. regardless of the composition of the wet raw material, preferably higher than 2000° K. The upper limit of 2350° K. is the temperature at which copper vaporization becomes excessive. The practical range for the oxygen/fuel ratio has been found to be 65%–95% of the ratio required for the stoichiometric combustion of the fuel, i.e. such that the combustion factor, $\lambda$ is between 0.65 and 0.95.

Example I

A copper precipitate containing 34% water and 66% solids of which 77.4% was copper (in the metallic and oxide form), was flame smelted and refined to a pure copper in accordance with the method described below. The level of critical impurities in the wet copper precipitate raw material is indicated in Table I below.

The wet copper precipitate was mixed with kerosene and a commercially available sulfonate base anionic surface active agent (Emcol-P5900) in a tank by means of a mechanical agitator to form a free-flowing slurry containing 50.0% solids, 25.8% water and 24.2% kerosene by weight. The slurry was then fed to a throat combustion burner such as shown in FIG. 2. The feed rate of the slurry was measured and regulated by the speed of the feed pump. The slurry was combusted with pure commercial grade oxygen. The flow rate of oxygen was regulated relative to the flow rate of the slurry at an oxygen/fuel ratio corresponding to a combustion factor of 0.69, and to obtain a flame temperature of 2050° K. The flame was directed downward in a refractory lined cylindrical furnace in which the refined metal was collected beneath a floating layer of slag formed during the smelting operation. Silica sand was added to the slag to flux it at a rate of 0.1 lbs. silica/lb. iron contained as an impurity in the copper precipitate raw material. Samples of the refined copper were withdrawn from the furnace and analyzed for impurities prior to deoxidation in order to directly measure the refining efficiency of the flame smelting and refining process. The results of the metal analysis of the copper product is shown in Table I below.

TABLE I

| Impurity | Weight percent | |
|---|---|---|
| | Raw material | Refined product |
| S | 0.25 | 0.0020 |
| Fe | 1.10 | 0.0038 |
| Mn | 0.037 | 0.0002 |
| Sn | 0.07 | 0.0093 |
| Pb | 0.14 | 0.0020 |
| Bi | 0.0002 | 0.0001 |
| Ni | 0.046 | 0.0025 |
| Sb | 0.007 | 0.0015 |
| As | 0.02 | 0.0040 |
| Te | 0.0006 | <0.0003 |

Example II

A wet copper precipitate containing critical impurities at the levels indicated in Table II, was used as the raw material to prepare a slurry, following the procedure of Example I, having the following composition: 52.1% solids, 28.4% water and 19.5% fuel (kerosene) by weight. Pure oxygen was used as the oxidizing gas at an oxygen/fuel ratio corresponding to a combustion factor of 0.88 to produce a flame temperature of 2100° K. The refined copper was analyzed prior to deoxidation and the level of metallic impurities in the resulting refined copper are shown in Table II.

TABLE II

| Impurity | Weight percent | |
|---|---|---|
| | Raw material | Refined product |
| S | 0.25 | 0.0032 |
| Fe | 1.10 | 0.0040 |
| Mn | 0.037 | <0.0001 |
| Sn | 0.07 | 0.0005 |
| Pb | 0.14 | <0.0003 |
| Bi | 0.0002 | <0.0002 |
| Ni | 0.046 | 0.0020 |
| Sb | 0.007 | <0.0002 |
| As | 0.02 | 0.0060 |
| Te | 0.0006 | <0.0010 |

Example III

A slurry was prepared as described in Example I, using a raw material containing about 20% water and consisting predominantly of a mixture of copper oxides at the following concentrations (dry basis):

47.99% $Cu_2O$,
23.63% $CuO$ and
15.08% $Cu$ (metallic)

The total contained copper was 76.5% in the material. The concentration of the critical impurities is indicated in Table III. The resulting slurry contained 64.9% solids, 15.4% water and 19.7% kerosene by weight. Oxygen-enriched air containing 41.1 volume percent oxygen was used as the oxidizing gas for combusting the slurry. The gas and slurry were fed to the burner to maintain an oxygen/fuel ratio corresponding to a combustion factor of 0.93. The refined metal was analyzed for impurities prior to deoxidation. The results are tabulated in Table III below.

TABLE III

| Impurity | Weight percent | |
|---|---|---|
| | Raw material | Refined product |
| S | 1.73 | 0.0005 |
| Fe | 2.20 | 0.0030 |
| Mn | 0.02 | <0.0001 |
| Sn | 0.07 | 0.0005 |
| Pb | 0.15 | 0.0002 |
| Bi | 0.0002 | <0.0002 |
| Ni | 0.060 | 0.0065 |
| Sb | 0.007 | 0.0004 |
| As | 0.02 | 0.0020 |
| Te | 0.0006 | <0.0005 |

From the results shown above it can be seen that the level of metallic impurity contamination in the copper can be reduced to very low levels by the process of the present invention.

What is claimed is:

1. A process for smelting and refining copper precipitate to refined copper comprising the steps of:
   (1) forming a free flowing slurry by mixing copper precipitate containing at least 15% by weight water with a liquid hydrocarbon fuel,
   (2) feeding said slurry and an oxygen containing gas into an internal combustion zone of a slurry burner, wherein said slurry is atomized,
   (3) combusting said fuel with the oxygen in the internal combustion zone of said burner to produce a stable flame,
   (4) controlling the feed rates of said slurry and oxygen containing gas such that the ratio of oxygen to fuel is maintained greater than 65% of the oxygen to fuel ratio required for stoichiometric combustion of the fuel, and maintaining the temperature of said flame between about 1900° K. and 2350° K., whereby the copper content of the precipitate is transformed into molten copper and the impurities are (a) vaporized, in the oxide or metallic form depending upon the susceptibility of the impurity to oxidation in the flame or (b) oxidized to impurity oxide species insoluble in molten copper, and
   (5) separating the molten copper from the vaporized impurity species and the insoluble impurity-oxide species by collecting the molten copper in a pool, by collecting the insoluble impurity-oxide species on top of said pool in a fluid slag layer, and by venting the vaporized impurity species.

2. The process of claim 1 wherein the flame temperature is maintained between 2000° K. and 2350° K.

3. The process of claim 1 wherein the oxygen containing gas is selected from the group consisting of air, oxygen-enriched air and oxygen.

4. The process of claim 1 wherein said oxygen containing gas contains at least 24% oxygen by volume.

5. The process of claim 1 wherein the copper precipitate contains from about 15% to 50% by weight water.

6. The process of claim 1 wherein a flux is added to the slurry of step (1).

7. The process of claim 1 wherein an emulsifying agent is added to assist in forming the slurry of step (1).

References Cited

UNITED STATES PATENTS

| | | | |
|---|---|---|---|
| 3,172,753 | 3/1965 | Walsh | 75—72 |
| 3,674,463 | 7/1972 | Yannopoulos | 75—74 |
| 3,545,962 | 12/1970 | Themelis et al. | 75—74 |
| 3,258,330 | 6/1966 | Ito | 75—75 |
| 3,529,956 | 9/1970 | Foard et al. | 75—76 |
| 3,427,151 | 2/1969 | Koudelka et al. | 75—76 |
| 3,700,431 | 10/1972 | Themelis et al. | 75—76 |

L. DEWAYNE RUTLEDGE, Primary Examiner

W. R. SATTERFIELD, Assistant Examiner

U.S. Cl. X.R.

75—72, 75